United States Patent [19]

Esler et al.

[11] 3,798,074

[45]*Mar. 19, 1974

[54] SURFACE FINISHING

[75] Inventors: Donald F. Esler, Natrona Heights; Edward G. Choby, Jr., Pittsburgh, both of Pa.

[73] Assignee: Allegheny Ludlum Industries, Inc., Pittsburgh, Pa.

[ * ] Notice: The portion of the term of this patent subsequent to Nov. 21, 1989, has been disclaimed.

[22] Filed: Mar. 23, 1972

[21] Appl. No.: 237,557

[52] U.S. Cl. ............................... 148/6.16, 148/6.2
[51] Int. Cl. ............................................. C23f 7/00
[58] Field of Search ................................... 148/6.16

[56] References Cited
UNITED STATES PATENTS
3,703,419  11/1972  Esler et al. ............................ 148/6.2
2,835,618  5/1958  Keller et al. ........................ 148/6.16

Primary Examiner—Ralph S. Kendall
Attorney, Agent, or Firm—Vincent G. Gioia; Robert F. Dropkin

[57] ABSTRACT

A composition for providing a protective coating, comprised of a solution containing phosphate ions, chromate ions, ammonium ions, silicate ions and cations. The molar concentration of the phosphate ions, chromate ions, ammonium ions and cations is between 0.01 and 1 mole per 100 ml. of solvent, and the molar concentration of the silicate ions is from 0.01–33 percent of the molar concentration of the phosphate ions, chromate ions, ammonium ions and cations. The phosphate ions, chromate ions, ammonium ions and cations are proportionately present in the solution as 8–78 mole percent phosphate ion, 2–45 mole percent chromate ion, 1–56 mole percent ammonium ion and 0.01 to 55 mole percent cation.

102 Claims, No Drawings

SURFACE FINISHING

The present invention relates to a protective coating, to a method of providing a metallic or glass surface with a protective coating and to a composite article comprised of a layer of metal or glass and a protective coating adhered thereto.

Numerous articles of manufacture, such as water fountains, building panels and mirrors, are subjected to severe abuse and in need of protective coatings. They are scratched, smeared by natural skin oils and other contaminants found on hands, weathered by various atmospheric conditions and stained by different solvents and chemicals.

Considerable time and money has been spent on developing a coating which will protect metallic and glass surfaces from the abuse they are subjected to. A particular coating is disclosed in copending U.S. Pat. application Ser. No. 68,789 filed on Sept. 1, 1970, which issued as U.S. Pat. No. 3,703,419 on Nov. 21, 1972. It teaches a cured coating of magnesium cations and anionic polymeric chains of chromium, oxygen, phosphorus and silicon atoms. Other coatings, containing cations from the group consisting of aluminum, beryllium, calcium, chromium, cobalt, copper, iron, lithium, nickel, potassium, sodium, strontium and zinc, are taught in this application.

It is accordingly an object of this invention to provide a protective coating.

It is another object of this invention to furnish a method of providing a metallic or glass surface with a protective coating.

It is a further object of this invention to provide a composite article comprised of a layer of metal or glass and a protective coating adhered thereto.

The composition of this invention is a solution having a molar concentration of phosphate ions, chromate ions, ammonium ions and cations from the group consisting of aluminum, beryllium, calcium, chromium, cobalt, copper, iron, lithium, nickel, potassium, sodium, strontium and zinc, of from 0.01 to 1.0 moles per 100 ml. of solvent and preferably from 0.2 to 0.6 mole per 100 ml. of solvent; and a molar concentration of silicate ions of from 0.01 to 33 percent, preferably 0.5 to 20%, of the molar concentration of said phosphate ions, chromate ions, ammonium ions and cations. An upper limit of 1.0 mole of phosphate ions, chromate ions, ammonium ions and cations per 100 ml. of solvent is set as solutions with higher concentrations of these ions having too high a solid level and produce a cloudy, bubbly coat. On the other hand, there does not appear to be a minimum concentration for them. Any composition which produces a transparent coating will continue to produce a transparent coating as the amount of solvent is increased. The only effect of dilution is to decrease the coating thickness. For practical purposes a lower limit of 0.01 mole per 100 ml. of solvent has been set. As a general rule water is the solvent of this invention, although the use of organic solvents is not excluded. In calculating molar concentrations, the only water considered is that added directly as such and as water of crystallization in the cation salts.

The phosphate ions, chromate ions, ammonium ions and cations are proportionately present in the solution as 8 to 78 mole percent phosphate ion, 2 to 45 mole percent chromate ion, 1 to 56 mole percent ammonium ion and 0.01 to 55 mole percent cation, and preferably as 33 to 73 mole percent phosphate ion, 5 to 27 mole percent chromate ion, 4 to 45 mole percent ammonium ion and 5 to 50 mole percent cation. Phosphate ion is required to render the solution acidic. A minimum phosphate level of at least 8 percent is necessary in order for the other ions of the solution to adequately dissolve. An upper limit of 78 mole percent is set as cured coatings are water soluble at higher levels. Chromate ion assists in giving the coating its transparency and renders the coating substantially water insoluble after curing. A minimum of at least 2 mole percent chromate ion is necessary as solutions with less produce opaque cured coatings. An upper limit of 45 mole percent is set as solutions with more chromate ion produce blotchy coatings which require excessive curing times. Ammonium ion assists in giving the coating its transparency. A minimum of at least 1 mole percent ammonium ion is necessary as solutions with less produce opaque cured coating. An upper limit of 56 mole percent is set as opaque cured coatings are also produced with solutions with more ammonium ion. The cations render the coating substantially water insoluble and decrease curing times. An upper limit of 55 mole percent cations is set as solutions with more cation exceed the solubility limit for the composition of this invention. Of course, the invention embraces the use of one or more of the referred to cations in any particular coating solution. Moreover, solutions with at least two cations can contain the magnesium cation of said heretofore referred to copending application.

Silicate ion improves the abrasion resistance of the coating. A molar concentration of 0.01 percent of the molar concentration for phosphate ions, chromate ions, ammonium ions and cations is sufficient. An upper molar concentration of 33 percent of the molar concentration of said ions is set as solutions with more silicate ion exceed the solubility limit of silicate ion, as $SiO_2$ (see discussion below), in the coating solution. The preferred range is from 0.5 to 22 percent of the molar concentration for said phosphate ions, chromate ions, ammonium ions and cations.

Minimum and maximum mole percentages for phosphate ions, chromate ions and ammonium ions, for each disclosed cation standing by itself, are set forth hereinbelow in Table I. Also set forth are maximum mole percentages for the cations as well as maximum molar concentration for each system. As stated above, the minimum mole percent for each cation is 0.01 percent and the minimum molar concentration is 0.01 mole per 100 ml. of solvent.

TABLE I

| | Ions (Mole %) | | | | | | | Maximum molar Concentration (Moles per 100 ml. solvent) |
|---|---|---|---|---|---|---|---|---|
| | Phosphate Ion | | Chromate Ion | | Ammonium Ion | | Cation | |
| Cation | Max. | Min. | Max. | Min. | Max. | Min. | Max. | |
| Aluminium | 74 | 35 | 28 | 2 | 33 | 3 | 41 | 0.87 |
| Beryllium | 67 | 26 | 32 | 6 | 33 | 8 | 41 | 0.80 |
| Calcium | 74 | 17 | 32 | 7 | 34 | 6 | 17 | 0.80 |

TABLE I — Continued

| | Ions (Mole %) | | | | | | | Maximum molar |
|---|---|---|---|---|---|---|---|---|
| | Phosphate Ion | | Chromate Ion | | Ammonium Ion | | Cation | Concentration (Moles per |
| Cation | Max. | Min. | Max. | Min. | Max. | Min. | Max. | 100 ml. solvent) |
| Chromium | 74 | 34 | 45 | 2 | 56 | 1 | 41 | 1.00 |
| Cobalt | 70 | 27 | 36 | 4 | 37 | 5 | 43 | 0.90 |
| Copper | 73 | 17 | 32 | 7 | 34 | 7 | 31 | 0.80 |
| Iron | 71 | 18 | 32 | 4 | 37 | 2 | 41 | 0.80 |
| Lithium | 71 | 16 | 33 | 6 | 29 | 1 | 36 | 0.80 |
| Nickel | 77 | 36 | 39 | 2 | 34 | 1 | 55 | 0.85 |
| Potassium | 67 | 41 | 35 | 8 | 24 | 3 | 36 | 0.80 |
| Sodium | 72 | 43 | 41 | 9 | 22 | 3 | 36 | 0.80 |
| Strontium | 74 | 8 | 36 | 7 | 35 | 7 | 28 | 0.90 |
| Zinc | 78 | 29 | 40 | 9 | 33 | 1 | 18 | 1.00 |

Preferred minimum and maximum mole percentages for phosphate ions, chromate ions and ammonium ions, along with maximum preferred mole percentages for each cation are set forth hereinbelow in Table II. The minimum preferred mole percentage for each cation is 5 percent and the preferred molar concentration is from 0.2 to 0.6 mole per 100 ml. of solvent.

TABLE II

| | Ions (Mole %) | | | | | | |
|---|---|---|---|---|---|---|---|
| | Phosphate Ion | | Chromate Ion | | Ammonium Ion | | Cation |
| Cation | Max. | Min. | Max. | Min. | Max. | Min. | Max. |
| Aluminium | 68 | 40 | 27 | 5 | 25 | 7 | 25 |
| Beryllium | 63 | 33 | 27 | 8 | 29 | 15 | 25 |
| Calcium | 70 | 33 | 27 | 9 | 29 | 10 | 12 |
| Chromium | 69 | 36 | 27 | 5 | 45 | 4 | 25 |
| Cobalt | 68 | 40 | 27 | 10 | 29 | 10 | 25 |
| Copper | 66 | 33 | 27 | 10 | 27 | 10 | 25 |
| Iron | 70 | 33 | 27 | 7 | 32 | 5 | 25 |
| Lithium | 66 | 33 | 27 | 10 | 27 | 5 | 25 |
| Nickel | 73 | 38 | 27 | 5 | 27 | 5 | 50 |
| Potassium | 63 | 43 | 27 | 10 | 19 | 6 | 33 |
| Sodium | 66 | 45 | 27 | 11 | 19 | 5 | 25 |
| Strontium | 69 | 33 | 27 | 10 | 26 | 10 | 25 |
| Zinc | 68 | 33 | 27 | 12 | 25 | 4 | 16 |

In the course of this application, the term phosphate ion includes all ions related to phosphoric acid in an aqueous solution. There, the species $H_3PO_4$, $H_2PO_4^-$, $HPO_4^=$ and $PO_4^\equiv$ and any polymeric phosphorus oxyacid anions are collectively referred to as phosphate ions. Similarly, $CrO_3$ in solution may exist as $CrO_4^=$, $Cr_2O_7^=$, etc., as well as in various protonated forms, all of which are included in the term chromate ion. The term silicate ion includes all the complex silicate ions but is taken as $SiO_2$, regardless of its actual chemical structure, for purposes of calculating the number of moles. Of the cations, chromium, cobalt, nickel, iron and copper can exist in more than one stable oxidation state. Chromium is available in either the + 3 or the + 6 oxidation state and it is the trivalent chromium cation which is referred to in this application. Hexavalent chromium (+ 6 oxidation state) is, however, present in the chromate which is a required component of the coating solution. Cationic iron can exist in both the + 2 and + 3 oxidation states, but the oxidation of ferrous iron (+ 2) to ferric iron (+ 3) is rapidly effected by chromates. Thus, a coating solution containing dispositive iron ion cannot be made. Attempts to prepare such a solution will produce a solution containing trivalent iron and trivalent chromium as cations. Cuprous ion (+ 1) is similarly, rapidly oxidized to cupric ion (+ 2) by chromates and hence copper cations are present in the cupric oxidation state. Nickel and cobalt can also exist as either divalent or trivalent cations and neither of them is oxidized from the + 2 to the + 3 oxidation state by chromate. Compounds of the + 3 oxidation state are, however, rarities with the exception of some complex oxides. Cobalt and nickel were therefore used as divalent cations.

The ions may be supplied in various ways. Phosphate ion is most conveniently supplied as ortho-phosphoric acid but can be supplied as a phosphate of one or more of the cations, as ammonium phosphate or as an ammonium phosphate compound of one or more of the cations. Chromate ion may be supplied as chromium trioxide or as the chromate or dichromate salts of ammonium or one or more of the cations. Cations may be supplied as the oxide, nitrate, hydroxide, silicate, sulfate, chloride, carbonate, bicarbonate, phosphate or chromate. Ammonium ion may be supplied as uncombined ammonia, aqueous ammonium hydroxide or as the phosphate, chromate, carbonate or bicarbonate salts. Silicate ion may be supplied from any water soluble silicate compound, i.e., compounds of silica which can be made to form a solution or sol with water. Illustrative water soluble silicate compounds are the alkali metal silicates, more particularly lithium silicate, sodium silicate, and potassium silicate, and colloidal sols of silica.

A wetting agent can be added to the coating solution to insure the best possible wetting action at the metal surface. The use of wetting agents is optional and by no means necessary. Typical wetting agents are "Wetanol" (Glyco Products, Inc., New York, N.Y.) and "Alkanol HCS" (E.I. du Pont de Nemours & Company, Wilmington, Del.).

The method of this invention comprises the steps of coating a metallic or glass surface with the above-described coating solution of this invention and curing the coating so as to render it substantially water insoluble.

Various coating methods can be employed for different embodiments of the invention, which is not dependent upon the use of any particular coating method. Illustrative coating methods are dip coating, flow coating, spray coating, and roll coating.

Curing is a time and temperature dependent process. Shorter times are required at higher temperatures and longer times are required at lower temperatures. We have reason to believe that curing temperatures, i.e., the temperature at the metallic or glass surface, of from 400°F to the melting point of the surface can be employed at times ranging from two seconds to four hours.

Various colors and tints can be given to the coating by varying the curing temperature, by altering the relative proportion of ions present in the solution, by altering the thickness of the cured coating and by adding pigments, dies and other chemical agents. This enables glass and certain metals to take on the appearance of color without special treatment. For example, stainless steel can be given the appearance of color without a heat tinting or other special coloring process.

The article of this invention is comprised of a layer of metal or glass and at least one layer of a protective substantially water insoluble, transparent, cured coating adhered directly thereto or through an intermediate coating. The coating is comprised of cations from the group consisting of aluminum, beryllium, calcium, chromium, cobalt, copper, iron, lithium, nickel, potassium, sodium, strontium, and zinc, and anionic polymeric chains of phosphorus chromium, oxygen and silicon atoms. No limit is placed on the thickness of the coating although it is generally less than 0.0005 inches. Coating layers thicker than 0.0005 inches require an excessive amount of coating solution and acquire a frosty appearance during curing.

Although the invention is believed to be adaptable to glass and a wide variety of metallic surfaces which include stainless steel, brass, aluminum, silver, zinc, copper, plain carbon steel, lead, chromium, nickel, gold plate, black chrome, and platinum; stainless steel embodiments are particularly important as stainless steel is probably the most important decorative metal and, accordingly, the following examples are directed to them. Stainless steel has a strikingly noticeable tendency to show scratches and marks which cannot be easily removed by any known commercial means without destroying its uniform appearance.

Coating solutions were prepared by mixing ortho-phosphoric acid (assay 85 percent), chromium trioxide, ammonium hydroxide, (conc.) salts of various cations, and potassium silicate in water. The analysis of the solutions appears hereinbelow in Table III. In calculating the molar concentration of the ions, the water present in the ammonium hydroxide (conc.), and ortho-phosphoric acid was ignored as was the water of neutralization. Water of crystallization in the cation salt was, however, included.

TABLE III

| Cation | Salt | Ions (mole percent) | | | | Molar conc. of ions of solution (moles per 100 ml. water) | Molar con. of silicate ions (mole percent of other ions) |
| | | Phosphate ion | Chromate ion | Ammonium ion | Cation | | |
| --- | --- | --- | --- | --- | --- | --- | --- |
| Aluminum | $Al(NO_3)_3 \cdot 9H_2O$ | 53 | 10 | 26 | 11 | 0.711 | 2.0 |
| Beryllium | $Be(NO_3)_2 \cdot 3H_2O$ | 62 | 10 | 15 | 12 | 0.517 | 1.7 |
| Calcium | $Ca(NO_3)_2 \cdot 2H_2O$ | 29 | 28 | 29 | 14 | 0.301 | 7.7 |
| Chromium | $Cr(NO_3)_3 \cdot 9H_2O$ | 70 | 15 | 1 | 14 | 0.546 | 3.6 |
| Cobalt | $Co(NO_3)_2 \cdot 6H_2O$ | 65 | 13 | 16 | 5 | 0.335 | 3.3 |
| Copper | $Cu(NO_3)_2 \cdot 3H_2O$ | 45 | 21 | 22 | 11 | 0.459 | 6.0 |
| Iron | $Fe(NO_3)_3 \cdot 9H_2O$ | 68 | 10 | 10 | 12 | 0.505 | 3.1 |
| Lithium | $Li_2CO_3$ | 16 | 33 | 29 | 22 | 0.253 | 6.7 |
| Nickel | $Ni(NO_3)_2 \cdot 6H_2O$ | 36 | 8 | 6 | 50 | 0.183 | 2.6 |
| Potassium | KOH | 52 | 11 | 4 | 33 | 0.450 | 2.2 |
| Sodium | NaOH | 62 | 11 | 9 | 18 | 0.641 | 2.0 |
| Strontium | $Sr(NO_3)_2$ | 55 | 14 | 13 | 19 | 0.617 | 3.6 |
| Zinc | ZnO | 29 | 31 | 25 | 15 | 0.417 | 7.3 |

Stainless steel samples were coated with the various solutions and subsequently cured. The coatings were applied by dipping at a rate of 3 inches per minute with the exception of the cobalt cation solutions which was applied by roll coating and with the exception of the nickel cation solution which was applied by spray coating. Curing took place in a 600°F oven, except for the cobalt wherein an 800°F oven was used, at periods sufficient to provide at least one minute wherein the surface of the stainless steel is approximately at 600°F. The samples were examined and tested after curing.

Examination and testing revealed that all the coatings were transparent and water resistant. The thickness of the coatings ranged from 20 to 64 microinches.

It will be apparent to those skilled in the art that the novel principles of the invention disclosed herein in connection with specific examples thereof, will suggest various other modifications and applications of the same. It is accordingly desired that in construing the breadth of the appended claims they shall not be limited to the specific examples of the invention disclosed herein.

We claim:

1. A composition for providing a transparent protective coating, consisting essentially of a solution containing phosphate ions, chromate ions, ammonium ions, silicate ions and cations from the group consisting of aluminum, beryllium, calcium, chromium, cobalt, copper, iron, lithium, nickel, potassium, sodium, strontium and zinc; said solution having a molar concentration of phosphate ions, chromate ions, ammonium ions and cations of between 0.01 and 1.0 mole per 100 ml. of solvent; said phosphate ions, chromate ions, ammonium ions and cations being proportionately present in said solution as 8 to 78 mole percent phosphate ion, 2 to 45 mole percent chromate ion, 1 to 56 percent ammonium ion and 0.01 to 55 mole percent cation; said solution having a molar concentration of silicate ions of from 0.01 to 33 percent of said molar concentration of phosphate ions, chromate ions, ammonium ions and cations.

2. A composition according to claim 1 wherein a cation is aluminum, wherein said molar concentration of phosphate ions, chromate ions, ammonium ions and aluminum ions is between 0.01 and 0.87 mole per 100 ml. of solvent, and wherein said phosphate ions, chromate ions, ammonium ions and aluminum ions are proportionately present in said solution as 35 to 74 mole percent phosphate ion, 2 to 28 mole percent chromate ion, 3 to 33 mole percent ammonium ion and 0.01 to 41 mole percent aluminum ion.

3. A composition according to claim 2 wherein said molar concentration of phosphate ions, chromate ions, ammonium ions and aluminum ions is between 0.2 and 0.6 mole per 100 ml. of solvent, and wherein said phosphate ions, chromate ions, ammonium ions and aluminum ions, are proportionately present in said solution as 40 to 68 mole percent phosphate ion, 5 to 27 mole percent chromate ion, 7 to 25 mole percent ammonium ion and 5 to 25 mole percent aluminum ion.

4. A composition according to claim 1 wherein a cation is beryllium, wherein said molar concentration of phosphate ions, chromate ions, ammonium ions and beryllium ions is between 0.01 and 0.80 mole per 100 ml. of solvent, and wherein said phosphate ions, chromate ions, ammonium ions and beryllium ions are proportionately present in said solution as 26 to 76 mole percent phosphate ion, 6 to 32 mole percent chromate ion, 8 to 33 mole percent ammonium ion and 0.01 to 41 mole percent beryllium ion.

5. A composition according to claim 4 wherein said molar concentration of phosphate ions, chromate ions, ammonium ions and beryllium ions is between 0.2 and 0.6 mole per 100 ml. of solvent, and wherein said phosphate ions, chromate ions, ammonium ions and beryllium ions, are proportionately present in said solution as 33 to 63 mole percent phosphate ion, 8 to 27 mole percent chromate ion, 15 to 29 mole percent ammonium ion and 5 to 25 percent beryllium ion.

6. A composition according to claim 1 wherein a cation is calcium, wherein said molar concentration of phosphate ions, chromate ions, ammonium ions and calcium ions is between 0.01 and 0.80 mole per 100 ml. of solvent, and wherein said phosphate ions, chromate ions, ammonium ions and calcium ions are proportionately present in said solution as 17 to 74 mole percent phosphate ion, 7 to 32 mole percent chromate ion, 6 to 34 mole percent ammonium ion and 0.01 to 17 mole percent calcium ion.

7. A composition according to claim 6 wherein said molar concentration of phosphate ions, chromate ions, ammonium ions and calcium ions is between 0.2 and 0.6 mole per 100 ml. of solvent, and wherein said phosphate ions, chromate ions, ammonium ions and calcium ions, are proportionately present in said solution as 33 to 70 mole percent phosphate ion, 9 to 27 mole percent chromate ion, 10 to 29 mole percent ammonium ion and 5 to 12 mole percent calcium ion.

8. A composition according to claim 1 wherein a cation is chromium, wherein said molar concentration of phosphate ions, chromate ions, ammonium ions and chromium ions is between 0.01 and 1.00 mole per 100 ml. of solvent, and wherein said phosphate ions, chromate ions, ammonium ions and chromium ions are proportionately present in said solution as 34 to 74 mole percent phosphate ion, 2 to 45 mole percent chromate ion, 1 to 56 mole percent ammonium ion and 0.01 to 41 mole percent chromium ion.

9. A composition according to claim 8 wherein said molar concentration of phosphate ions, chromate ions, ammonium ions and chromium ions is between 0.2 and 0.6 mole per 100 ml. of solvent, and wherein said phosphate ions, chromate ions, ammonium ions and chromium ions, are proportionately present in said solution as 36 to 69 mole percent phosphate ion, 5 to 27 mole percent chromate ion, 4 to 45 mole percent ammonium ion and 5 to 25 mole percent chromium ion.

10. A composition according to claim 1 wherein a cation is cobalt, wherein said molar concentration of phosphate ions, chromate ions, ammonium ions and cobalt ions is between 0.01 and 0.90 mole per 100 ml. of solvent, and wherein said phosphate ions, chromate ions, ammonium ions and cobalt ions are proportionately present in said solution as 27 to 70 mole percent phosphate ion, 4 to 36 mole percent chromate ion, 5 to 37 mole percent ammonium ion and 0.01 to 43 mole percent cobalt ion.

11. A composition according to claim 10 wherein said molar concentration of phosphate ions, chromate ions, ammonium ions and cobalt ions is between 0.2 and 0.6 mole per 100 ml. of solvent, and wherein said phosphate ions, chromate ions, ammonium ions and cobalt ions, are proportionately present in said solution as 40 to 68 mole percent phosphate ion, 10 to 27 mole percent chromate ion, 10 to 29 mole percent ammonium ion and 5 to 25 mole percent cobalt ion.

12. A composition according to claim 1 wherein a cation is copper, wherein said molar concentration of phosphate ions, chromate ions, ammonium ions and copper ions is between 0.01 and 0.80 mole per 100 ml. of solvent, and wherein said phosphate ions, chromate ions, ammonium ions and copper ions are proportionately present in said solution as 17 to 73 mole percent phosphate ion, 7 to 32 mole percent chromate ion, 7 to 34 mole percent ammonium ion and 0.01 to 31 mole percent copper ion.

13. A composition according to claim 12 wherein said molar concentration of phosphate ions, chromate ions, ammonium ions and copper ions is between 0.2 and 0.6 mole per 100 ml. of solvent, and wherein said phosphate ions, chromate ions, ammonium ions and copper ions, are proportionately present in said solution as 33 to 66 mole percent phosphate ion, 10 to 27 mole percent chromate ion, 10 to 27 mole percent ammonium ion and 5 to 25 mole percent copper ion.

14. A composition according to claim 1 wherein a cation is iron, wherein said molar concentration of phosphate ions, chromate ions, ammonium ions and iron ions is between 0.01 and 0.80 mole per 100 ml. of solvent, and wherein said phosphate ions, chromate ions, ammonium ions and iron ions are proportionately present in said solution as 18 to 71 mole percent phosphate ion, 4 to 32 mole percent chromate ion, 2 to 37 mole percent ammonium ion and 0.01 to 41 mole percent iron ion.

15. A composition according to claim 14 wherein said molar concentration of phosphate ions, chromate ions, ammonium ions and iron ions is between 0.2 and 0.6 mole per 100 ml. of solvent, and wherein said phosphate ions, chromate ions, ammonium ions and iron ions, are proportionately present in said solution as 33 to 70 mole percent phosphate ion, 7 to 27 mole percent chromate ion, 5 to 32 mole percent ammonium ion and 5 to 25 mole percent iron ion.

16. A composition according to claim 1 wherein a cation is lithium, wherein said molar concentration of phosphate ions, chromate ions, ammonium ions and lithium ions is between 0.01 and 0.80 mole per 100 ml. of solvent, and wherein said phosphate ions, chromate ions, ammonium ions and lithium ions are proportionately present in said solution as 16 to 71 mole percent phosphate ion, 6 to 33 mole percent chromate ion, 1 to 29 mole percent ammonium ion and 0.01 to 36 mole percent lithium ion.

17. A composition according to claim 16 wherein said molar concentration of phosphate ions, chromate ions, ammonium ions and lithium ions is between 0.2 and 0.6 mole per 100 ml. of solvent, and wherein said phosphate ions, chromate ions, ammonium ions and lithium ions, are proportionately present in said solution as 33 to 66 mole percent phosphate ion, 10 to 27 mole percent chromate ion, 5 to 27 mole percent ammonium ion and 5 to 25 mole percent lithium ion.

18. A composition according to claim 1 wherein a cation is nickel, wherein said molar concentration of phosphate ions, chromate ions, ammonium ions and nickel ions is between 0.01 and 0.85 mole per 100 ml. of solvent, and wherein said phosphate ions, chromate ions, ammonium ions and nickel ions are proportionately present in said solution as 36 to 77 mole percent phosphate ion, 2 to 39 mole percent chromate ion, 1 to 34 mole percent ammonium ion and 0.01 to 55 mole percent nickel ion.

19. A composition according to claim 18 wherein said molar concentration of phosphate ions, chromate ions, ammonium ions and nickel ions is between 0.2 and 0.6 mole per 100 ml. of solvent, and wherein said phosphate ions, chromate ions, ammonium ions and nickel ions, are proportionately present in said solution as 38 to 73 mole percent phosphate ion, 5 to 27 mole percent chromate ion, 5 to 27 mole percent ammonium ion and 5 to 50 mole percent nickel ion.

20. A composition according to claim 1 wherein a cation is potassium, wherein said molar concentration of phosphate ions, chromate ions, ammonium ions and potassium ions is between 0.01 and 0.80 mole per 100 ml. of solvent, and wherein said phosphate ions, chromate ions, ammonium ions and potassium ions are proportionately present in said solution as 41 to 67 mole percent phosphate ion, 8 to 35 mole percent chromate ion, 3 to 24 mole percent ammonium ion and 0.01 to 36 mole percent potassium ion.

21. A composition according to claim 20 wherein said molar concentration of phosphate ions, chromate ions, ammonium ions and potassium ions is between 0.2 and 0.6 mole per 100 ml. of solvent, and wherein said phosphate ions, chromate ions, ammonium ions and potassium ions, are proportionately present in said solution as 43 to 63 mole percent phosphate ion, 10 to 27 mole percent chromate ion, 6 to 19 mole percent ammonium ion and 5 to 33 mole percent potassium ion.

22. A composition according to claim 1 wherein a cation is sodium, wherein said molar concentration of phosphate ions, chromate ions, ammonium ions and sodium ions is between 0.01 and 0.80 mole per 100 ml. of solvent, and wherein said phosphate ions, chromate ions, ammonium ions and sodium ions are proportionately present in said solution as 43 to 72 mole percent phosphate ion, 9 to 41 mole percent chromate ion, 3 to 22 mole percent ammonium ion and 0.01 to 36 mole percent sodium ion.

23. A composition according to claim 22 wherein said molar concentration of phosphate ions, chromate ions, ammonium ions and sodium ions is between 0.2 and 0.6 mole per 100 ml. of solvent, and wherein said phosphate ions, chromate ions, ammonium ions and sodium ions, are proportionately present in said solution as 45 to 66 mole percent phosphate ion, 11 to 27 mole percent chromate ion, 5 to 19 mole percent ammonium ion and 5 to 25 mole percent sodium ion.

24. A composition according to claim 1 wherein a cation is strontium, wherein said molar concentration of phosphate ions, chromate ions, ammonium ions and strontium ions is between 0.01 and 0.90 mole per 100 ml. of solvent, and wherein said phosphate ions, chromate ions, ammonium ions and strontium ions are proportionately present in said solution as 8 to 74 mole percent phosphate ion, 7 to 36 mole percent chromate ion, 7 to 35 mole percent ammonium ion and 0.01 to 28 mole percent strontium ion.

25. A composition according to claim 24 wherein said molar concentration of phosphate ions, chromate ions, ammonium ions and strontium ions is between 0.2 and 0.6 mole per 100 ml. of solvent, and wherein said phosphate ions, chromate ions, ammonium ions and strontium ions, are proportionately present in said solution as 33 to 69 mole percent phosphate ion, 10 to 27 mole percent chromate ion, 10 to 26 mole percent ammonium ion and 5 to 25 mole percent strontium ion.

26. A composition according to claim 1 wherein a cation is zinc, wherein said molar concentration of phosphate ions, chromate ions, ammonium ions and zinc ions is between 0.01 and 1.00 mole per 100 ml. of solvent, and wherein said phosphate ions, chromate ions, ammonium ions and zinc ions are proportionately present in said solution as 29 to 78 mole percent phosphate ion, 9 to 40 mole percent chromate ion, 1 to 33 mole percent ammonium ion and 0.01 to 18 mole percent zinc ion.

27. A composition according to claim 26 wherein said molar concentration of phosphate ions, chromate ions, ammonium ions and zinc ions is between 0.2 and 0.6 mole per 100 ml. of solvent, and wherein said phosphate ions, chromate ions, ammonium ions and zinc ions, are proportionately present in said solution as 33 to 68 mole percent phosphate ion, 12 to 27 mole percent chromate ion, 4 to 25 mole percent ammonium ion and 5 to 16 mole percent zinc ion.

28. A composition according to claim 1 wherein said molar concentration of phosphate ions, chromate ions, ammonium ions and cations is between 0.2 and 0.6 mole per 100 ml. of solvent, wherein said phosphate ions, chromate ions, ammonium ions and cations are proportionately present in said solution as 33 to 73 mole percent phosphate ion, 5 to 27 mole percent chromate ion, 4 to 45 mole percent ammonium ion and 5 to 50 mole percent cation, and wherein said molar concentration of silicate ions is from 0.5 to 20 percent of said molar concentration of phosphate ions, chromate ions, ammonium ions and cations.

29. A composition for providing a transparent protective coating consisting essentially of a solution containing phosphate ions, chromate ions, ammonium ions, silicate ions and at least two cations from the group consisting of aluminum, beryllium, calcium, chromium, cobalt, copper, iron, lithium, magnesium, nickel, potassium, sodium, strontium and zinc; said solution having a molar concentration of phosphate ions, chromate ions, ammonium ions and cations of between 0.01 and 1.0 mole per 100 ml. of solvent; said phosphate ions, chromate ions, ammonium ions and cations being proportionately present in said solution as 8 to 78 mole percent phosphate ion, 2 to 45 mole percent chromate ion, 1 to 56 mole percent ammonium ion and 0.01 to 55 mole percent cation; said solution having a molar concentration of silicate ions from 0.01 to 33 percent of said molar concentration of phosphate ions, chromate ions, ammonium ions and cations.

30. A method of providing a surface with a transparent, cured protective coating, which comprises the steps of: coating said surface with a composition consisting essentially of a solution containing phosphate ions, chromate ions, ammonium ions, silicate ions and cations from the group consisting of aluminum, beryllium, calcium, chromium, cobalt, copper, iron, lithium, nickel, potassium, sodium, strontium and zinc, and curing said coating so as to render it substantially water insoluble; said solution having a molar concentration of phosphate ions, chromate ions, ammonium ions and cations of between 0.01 and 1.0 moles per 100 ml. of solvent; said phosphate ions, chromate ions, ammonium ions and cations being proportionally present in said solution as 8 to 78 mole percent phosphate ion, 2 to 45 mole percent chromate ion, 1 to 56 mole percent ammonium ion and 0.01 to 55 mole percent cation; said solution having a molar concentration of silicate ions of from 0.01 to 33 percent of said molar concentration of phosphate ions, chromate ions, ammonium ions and cations.

31. A method according to claim 30 adapted to protect a metallic surface.

32. A method according to claim 31 wherein said metallic surface is stainless steel.

33. A method according to claim 31 wherein said metallic surface is brass.

34. A method according to claim 31 wherein said metallic surface is silver.

35. A method according to claim 31 wherein said metallic surface is aluminum.

36. A method according to claim 30 adapted to protect a glass surface.

37. A method according to claim 30 wherein a cation is aluminum wherein said molar concentration of phosphate ions, chromate ions, ammonium ions and aluminum ions is between 0.01 and 0.87 mole per 100 ml. of solvent, and wherein said phosphate ions, chromate ions, ammonium ions and aluminum ions are proportionately present in said solution as 35 to 74 mole percent phosphate ion, 2 to 28 mole percent chromate ion, 3 to 33 mole percent ammonium ion and 0.01 to 41 mole percent aluminum ion.

38. A method according to claim 30 wherein a cation is beryllium, wherein said molar concentration of phosphate ions, chromate ions, ammonium ions and beryllium ions is between 0.01 and 0.80 mole per 100 ml. of solvent, and wherein said phosphate ions, chromate ions, ammonium ions and beryllium ions are proportionately present in said solution as 26 to 67 mole percent phosphate ion, 6 to 32 mole percent chromate ion, 8 to 33 mole percent ammonium ion and 0.01 to 41 mole percent beryllium ion.

39. A method according to claim 30 wherein a cation is calcium, wherein said molar concentration of phosphate ions, chromate ions, ammonium ions and calcium ions is between 0.01 and 0.80 mole per 100 ml. of solvent, and wherein said phosphate ions, chromate ions, ammonium ions and calcium ions are proportionately present in said solution as 17 to 74 mole percent phosphate ion, 7 to 32 mole percent chromate ion, 6 to 34 mole percent ammonium ion and 0.01 to 17 mole percent calcium ion.

40. A method according to claim 30 wherein a cation is chromium, wherein said molar concentration of phosphate ions, chromate ions, ammonium ions and chromium ions is between 0.01 and 1.00 mole per 100 ml. of solvent, and wherein said phosphate ions, chromate ions, ammonium ions and chromium ions are proportionately present in said solution as 34 to 74 mole percent phosphate ion, 2 to 45 mole percent chromate ion, 1-56 mole % ammonium ion and 0.01 to 41 mole percent chromium ion.

41. A method according to claim 30 wherein a cation is cobalt, wherein said molar concentration of phosphate ions, chromate ions, ammonium ions and cobalt ions is between 0.01 and 0.90 mole per 100 ml. of solvent, and wherein said phosphate ions, chromate ions, ammonium ions and cobalt ions are proportionately present in said solution as 27 to 70 mole percent phosphate ion, 4 to 36 mole percent chromate ion, 5 to 37 mole percent ammonium ion and 0.01 to 43 mole percent cobalt ion.

42. A method according to claim 41 adapted to protect a metallic surface.

43. A method according to claim 42 wherein said metallic surface is stainless steel.

44. A method according to claim 42 wherein said metallic surface is brass.

45. A method according to claim 42 wherein said metallic surface is silver.

46. A method according to claim 42 wherein said metallic surface is aluminum.

47. A method according to claim 30 wherein a cation is copper, wherein said molar concentration of phosphate ions, chromate ions, ammonium ions and copper ions is between 0.01 and 0.80 mole per 100 ml. of solvent, and wherein said phosphate ions, chromate ions, ammonium ions and copper ions are proportionately present in said solution as 17 to 73 mole percent phosphate ion, 7 to 32 mole percent chromate ion, 7 to 34 mole percent ammonium ion and 0.01 to 31 mole percent copper ion.

48. A method according to claim 30 wherein a cation is iron, wherein said molar concentration of phosphate ions, chromate ions, ammonium ions and iron ions is between 0.01 and 0.80 mole per 100 ml. of solvent, and wherein said phosphate ions, chromate ions, ammonium ions and iron ions are proportionately present in said solution as 18 to 71 mole percent phosphate ion, 4 to 32 mole percent chromate ion, 2 to 37 mole percent ammonium ion and 0.01 to 41 mole percent iron ion.

49. A method according to claim 30 wherein a cation is lithium wherein said molar concentration of phosphate ions, chromate ions, ammonium ions and lithium ions is between 0.01 and 0.80 mole per 100 ml. of solvent, and wherein said phosphate ions, chromate ions, ammonium ions and lithium ions are proportionately present in said solution as 16 to 71 mole percent phosphate ion, 6 to 33 mole percent chromate ion, 1 to 29 mole percent ammonium ion and 0.01 to 36 mole percent lithium ion.

50. A method according to claim 30 wherein a cation is nickel, wherein said molar concentration of phosphate ions, chromate ions, ammonium ions and nickel ions is between 0.01 and 0.85 mole per 100 ml. of solvent, and wherein said phosphate ions, chromate ions, ammonium ions and nickel ions are proportionately present in said solution as 36 to 77 mole percent phosphate ion, 2 to 39 mole percent chromate ion, 1 to 34 mole percent ammonium ion and 0.01 to 55 mole percent nickel ion.

51. A method according to claim 30 wherein a cation is potassium, wherein said molar concentration of phosphate ions, chromate ions, ammonium ions and potassium ions is between 0.01 and 0.80 mole per 100 ml. of solvent, and wherein said phosphate ions, chromate ions, ammonium ions and potassium ions are proportionately present in said solution as 41 to 67 mole percent phosphate ion, 8 to 35 mole percent chromate ion, 3 to 24 mole percent ammonium ion and 0.01 to 36 mole percent potassium ion.

52. A method according to claim 30 wherein a cation is sodium, wherein said molar concentration of phosphate ions, chromate ions, ammonium ions and sodium ions is between 0.01 and 0.80 mole per 100 ml. of solvent, and wherein said phosphate ions, chromate ions, ammonium ions and sodium ions are proportionately present in said solution as 43 to 72 mole percent phosphate ion, 9 to 41 mole percent chromate ion, 3 to 22 mole percent ammonium ion and 0.01 to 36 mole percent sodium ion.

53. A method according to claim 30 wherein a cation is strontium, wherein said molar concentration of phosphate ions, chromate ions, ammonium ions and strontium ions is between 0.01 and 0.90 mole per 100 ml. of solvent, and wherein said phosphate ions, chromate ions, ammonium ions and strontium ions are proportionately present in said solution as 8 to 74 mole percent phosphate ion, 7 to 36 mole percent chromate ion, 7 to 35 mole percent ammonium ion and 0.01 to 28 mole percent strontium ion.

54. A method according to claim 30 wherein a cation is zinc, wherein said molar concentration of phosphate ions, chromate ions, ammonium ions and zinc ions is between 0.01 and 1.00 mole per 100 ml. of solvent, and wherein said phosphate ions, chromate ions, ammonium ions and zinc ions are proportionately present in said solution as 29 to 78 mole percent phosphate ion, 9 to 40 mole percent chromate ion, 1 to 33 mole percent ammonium ion and 0.01 to 18 mole percent zinc ion.

55. A method according to claim 30 adapted to provide a colored protective coating which includes the step of adding pigments or dies to the coating solution.

56. A method according to claim 30 wherein said coating is cured by heating said surface at a temperature of at least 400°F for a period of from 2 seconds to 4 hours.

57. A method according to claim 30 wherein said molar concentration of phosphate ions, chromate ions, ammonium ions and cations is between 0.2 and 0.6 moles per 100 ml. of solvent, wherein said phosphate ions, chromate ions, ammonium ions and cations are proportionately present in said solution as 33 to 73 mole percent phosphate ion, 5 to 27 mole percent chromate ion, 4 to 45 mole percent ammonium ion and 5 to 50 mole percent cation, and wherein said molar concentration of silicate ions is from 0.5 to 20 percent of said molar concentration of phosphate ions, chromate ions, ammonium ions and cations.

58. A method of providing a surface with a transparent, cured protective coating, which comprises the steps of: coating said surface with a composition consisting essentially of a solution containing phosphate ions, chromate ions, ammonium ions, silicate ions and at least two cations from the group consisting of aluminum, beryllium, calcium, chromium, cobalt, copper, ion, litium, magnesium, nickel, potassium, sodium, strontium and zinc, and curing said coating so as to render it substantially water insoluble; said solution having a molar concentration of phosphate ions, chromate ions, ammonium ions and cations of between 0.01 and 1.0 mole per 100 ml. of solvent; said phosphate ions, chromate ions, ammonium ions and cations being proportionately present in said solution as 8 to 78 mole percent phosphate ion, 2 to 45 mole percent chromate ion, 1 to 56 mole percent ammonium ion and 0.01 to 55 mole percent cation; said solution having a molar concentration of silicate ions of from 0.01 to 33 percent of said molar concentration of phosphate ions, chromate ions, ammonium ions and cations.

59. A method according to claim 58 adapted to protect a metallic surface.

60. A method according to claim 59 wherein said metallic surface is stainless steel.

61. A method according to claim 59 wherein said metallic surface is brass.

62. A method according to claim 59 wherein said metallic surface is aluminum.

63. A method according to claim 58 adapted to protect a glass surface.

64. A composite article comprising a layer of metal or glass adhered to at least one layer of a substantially water insoluble, transparent, cured protective coating of cations selected from the group consisting of aluminum, beryllium, calcium, chromium, cobalt, copper, iron, lithium, nickel, potassium, sodium, strontium and zinc and anionic polymeric chains of phosphorus, chromium, oxygen and silicon atoms: said coating having been formed from a solution of phosphate ions, chromate ions, ammonium ions, silicate ions and cations; said solution having a molar concentration of phosphate ions, chromate ions, ammonium ions and cations of between 0.01 and 1.0 mole per 100 ml. of solvent; said phosphate ions, chromate ions, ammonium ions and cations being proportionately present in said solution as 8 to 78 mole percent phosphate ion, 2 to 45 mole percent chromate ion, 1 to 56 mole percent ammonium ion and 0.01 to 55 mole percent cation; said solution having a molar concentration of silicate ions of from 0.01 to 33 percent of said molar concentration of phosphate ions, chromate ions, ammonium ions and cations.

65. A composite article according to claim 64 wherein said protective coating is less than 0.0005 inch thick.

66. A composite article according to claim 64 wherein a layer of said protective coating is adhered to a metallic surface.

67. A composite article according to claim 66 wherein said metallic surface is stainless steel.

68. A composite article according to claim 66 wherein said metallic surface is brass.

69. A composite article according to claim 66 wherein said metallic surface is aluminum.

70. A composite article according to claim 66 wherein said metallic surface is silver.

71. A composite article according to claim 64 wherein a layer of said protective coating is adhered to a glass surface.

72. A composite article according to claim 64 wherein said protective coating is transparent and colorless.

73. A composite article according to claim 64 wherein said protective coating is transparent and colored.

74. A composite article according to claim 64, having a coating formed from a solution wherein a cation is aluminum, wherein said molar concentration of phosphate ions, chromate ions, ammonium ions and aluminum ions is between 0.01 and 0.87 mole per 100 ml. of solvent, and wherein said phosphate ions, chromate ions, ammonium ions and aluminum ions are proportionately present in said solution as 35 to 74 mole percent phosphate ion, 2 to 28 mole percent chromate ion, 3 to 33 mole percent ammonium ion and 0.01 to 41 mole percent aluminum ion.

75. A composite article according to claim 64, having a coating formed from a solution wherein a cation is beryllium, wherein said molar concentration of phosphate ions, chromate ions, ammonium ions and beryllium ions is between 0.01 and 0.80 mole per 100 ml. of solvent, and wherein said phosphate ions, chromate ions, ammonium ions and beryllium ions are proportionately present in said solution as 26 to 67 mole percent phosphate ion, 6 to 32 mole percent chromate ions, 8 to 33 mole percent ammonium ion and 0.01 to 41 mole percent beryllium ion.

76. A composite article according to claim 64 having a coating formed from a solution wherein a cation is calcium, wherein said molar concentration of phosphate ions, chromate ions, ammonium ions and calcium ions is between 0.01 and 0.80 mole per 100 ml. of solvent, and wherein said phosphate ions, chromate ions, ammonium ions and calcium ions are proportionately present in said solution as 17 to 74 mole percent phosphate ion, 7 to 32 mole percent chromate ion, 6 to 34 mole percent ammonium ion and 0.01 to 17 mole percent calcium ion.

77. A composite article according to claim 64 having a coating formed from a solution wherein a cation is chromium, wherein said molar concentration of phosphate ions, chromate ions, ammonium ions and chromium ions is between 0.01 and 1.00 mole per 100 ml. of solvent, and wherein said phosphate ions, chromate ions, ammonium ions and chromium ions are proportionately present in said solution as 34 to 74 mole percent phosphate ion, 2 to 45 mole percent chromate ion, 1 to 56 mole percent ammonium ion and 0.01 to 41 mole percent chromium ion.

78. A composite article according to claim 64 having a coating formed from a solution wherein a cation is cobalt, wherein said molar concentration of phosphate ions, chromate ions, ammonium ions and cobalt ions is between 0.01 and 0.90 mole per 100 ml. of solvent, and wherein said phosphate ions, chromate ions, ammonium ions and cobalt ions are proportionately present in said solution as 27 to 70 mole percent phosphate ion, 4 to 36 mole percent chromate ion, 5 to 37 mole percent ammonium ion and 0.01 to 43 mole percent cobalt ion.

79. A composite article according to claim 78 wherein a layer of said protective coating is adhered to a metallic surface.

80. A composite article according to claim 79 wherein said metallic surface is stainless steel.

81. A composite article according to claim 79 wherein said metallic surface is brass.

82. A composite article according to claim 79 wherein said metallic surface is aluminum.

83. A composite article according to claim 79 wherein said metallic surface is silver.

84. A composite article according to claim 64 having a coating formed from a solution wherein a cation is copper, wherein said molar concentration of phosphate ions, chromate ions, ammonium ions and copper ions is between 0.01 and 0.80 mole per 100 ml. of solvent, and wherein said phosphate ions, chromate ions, ammonium ions and copper ions are proportionately present in said solution as 17 to 73 mole percent phosphate ion, 7 to 32 mole percent chromate ion, 7 to 34 mole percent ammonium ion and 0.01 to 31 mole percent copper ion.

85. A composite article according to claim 64 having a coating formed from a solution wherein a cation is iron, wherein said molar concentration of phosphate ions, chromate ions, ammonium ions and iron ions is between 0.01 and 0.80 mole per 100 ml. of solvent, and wherein said phosphate ions, chromate ions, ammonium ions and iron ions are proportionately present in said solution as 18 to 71 mole percent phosphate ions, 4 to 32 mole percent chromate ion, 2 to 37 mole percent ammonium ion and 0.01 to 41 mole percent iron ion.

86. A composite article according to claim 64, having a coating formed from a solution wherein a cation is lithium, wherein said molar concentration of phosphate ions, chromate ions, ammonium ions and lithium ions is between 0.01 and 0.80 mole per 100 ml. of solvent, and wherein said phosphate ions, chromate ions, ammonium ions and lithium ions are proportionately present in said solution as 16 to 71 mole percent phosphate ion, 6 to 33 mole percent chromate ion, 1 to 29 mole percent ammonium ion and 0.01 to 36 mole percent lithium ion.

87. A composite article according to claim 64 having a coating formed from a solution wherein a cation is nickel, wherein said molar concentration of phosphate ions, chromate ions, ammonium ions and nickel ions is between 0.01 and 0.85 mole per 100 ml. of solvent, and wherein saidphosphate ions, chromate ions, ammonium ions and nickel ions are proportionately present in said solution as 36 to 77 mole percent phosphate ion, 2 to 39 mole percent chromate ion, 1 to 34 mole percent ammonium ion and 0.01 to 55 mole percent nickel ion.

88. A composite article according to claim 64 having a coating formed from a solution wherein a cation is potassium, wherein said molar concentration of phosphate ions, chromate ions, ammonium ions and potassium ions is between 0.01 and 0.80 mole per 100 ml. of solvent, and wherein said phosphate ions, chromate ions, ammonium ions and potassium ions are proportionately present in said solution as 41 to 67 mole percent phosphate ion, 8 to 35 mole percent chromate ion, 3 to 24 mole percent ammonium ion and 0.01 to 36 mole percent potassium ion.

89. A composite article according to claim 64 having a coating formed from a solution wherein a cation is sodium, wherein said molar concentration of phosphate ions, chromate ions, ammonium ions and sodium ions is between 0.01 and 0.80 mole per 100 ml. of solvent, and wherein said phosphate ions, chromate ions, ammonium ions and sodium ions are proportionately present in said solution as 43 to 72 mole percent phosphate ion, 9 to 41 mole percent chromate ion, 3 to 22 mole percent ammonium and 0.01 to 36 mole percent sodium ion.

90. A composite article according to claim 64 having a coating formed from a solution wherein a cation is strontium, wherein said molar concentration of phosphate ions, chromate ions, ammonium ions and strontium ions is between 0.01 and 0.90 mole per 100 ml. of solvent, and wherein said phosphate ions, chromate ions, ammonium ions and strontium ions are proportionately present in said solution as 8 to 74 mole percent phosphate ion, 7 to 36 mole percent chromate ion, 7 to 35 mole percent ammonium ion and 0.01 to 28 mole percent strontium ion.

91. A composite article according to claim 64 having a coating formed from a solution wherein a cation is zinc, wherein said molar concentration of phosphate ions, chromate ions, ammonium ions and zinc ions is between 0.01 and 1.00 mole per 100 ml. of solvent, and wherein said phosphate ions, chromate ions, ammonium ions and zinc ions are proportionately present in said solution as 29 to 78 mole percent phosphate ion, 9 to 40 mole percent chromate ion, 1 to 33 mole percent ammonium ion and 0.01 to 18 mole percent zinc ion.

92. A composite article according to claim 64 wherein said coating is formed from a solution having a molar concentration of phosphate ions, chromate ions, ammonium ions and cations of between 0.2 and 0.6 mole per 100 ml. of solvent, wherein said phosphate ions, chromate ions, ammonium ions and cations are proportionately present in said solution as 33 to 73 mole percent phosphate ion, 5 to 27 mole percent chromate ion, 4 to 45 mole percent ammonium ion and 5 to 50 mole percent cation, and wherein said molar concentration of silicate ions is from 0.5 to 20 percent of said molar concentration of phosphate ions, chromate ions, ammonium ions and cations.

93. A composite article comprising a layer of metal or glass adhered to at least one layer of a substantially water insoluble, transparent, cured protective coating of at least two cations selected from the group consisting of aluminum, beryllium, calcium, chromium, cobalt, copper, iron, lithium, magnesium, nickel, potassium, sodium, strontium and zinc and anionic polymeric chains of phosphorus, chromium, oxygen and silicon atoms: said coating having been formed from a solution of phosphate ions, chromate ions, ammonium ions, silicate ions and cations; said solution having a molar concentration of phosphate ions, chromate ions, ammonium ions and cations of between 0.01 and 1.0 mole per 100 ml. of solvent; said phosphate ions, chromate ions, ammonium ions and cations being proportionately present in said solution as 8 to 78 mole percent phosphate ion, 2 to 45 mole percent chromate ion, 1 to 56 mole percent ammonium ion and 0.01 to 55 mole percent cation; said solution having a molar concentration of silicate ions of from 0.01 to 33 percent of said molar concentration of phosphate ions, chromate ions, ammonium ions and cations.

94. A composite article according to claim 93 wherein said protective coating is less than 0.0005 inch thick.

95. A composite article according to claim 93 wherein a layer of said protective coating is adhered to a metallic surface.

96. A composite article according to claim 95 wherein said metallic surface is stainless steel.

97. A composite article according to claim 95 wherein said metallic surface is brass.

98. A composite article according to claim 95 wherein said metallic surface is aluminum.

99. A composite article according to claim 95 wherein said metallic surface is silver.

100. A composite article according to claim 93 wherein a layer of said protective coating is adhered to a glass surface.

101. A composite article according to claim 93 wherein said protective coating is transparent and colorless.

102. A composite article according to claim 93 wherein said protective coating is transparent and colored.

* * * * *